United States Patent
Raaymakers et al.

(10) Patent No.: US 7,633,841 B2
(45) Date of Patent: Dec. 15, 2009

(54) METHOD AND DEVICE FOR TILT COMPENSATION IN AN OPTICAL STORAGE SYSTEM

(75) Inventors: Jeroen A. L. J. Raaymakers, Eindhoven (NL); Alexandre Pechev, Farnham (GB); Johannes A. Van Rooij, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 488 days.

(21) Appl. No.: 11/573,054

(22) PCT Filed: Jul. 19, 2005

(86) PCT No.: PCT/IB2005/052403

§ 371 (c)(1),
(2), (4) Date: Feb. 1, 2007

(87) PCT Pub. No.: WO2006/016287

PCT Pub. Date: Feb. 16, 2006

(65) Prior Publication Data

US 2008/0298183 A1 Dec. 4, 2008

(30) Foreign Application Priority Data

Aug. 6, 2004 (EP) .................................. 04300522

(51) Int. Cl.
*G11B 7/00* (2006.01)

(52) U.S. Cl. ............... 369/44.32; 369/44.28; 369/53.19
(58) Field of Classification Search ....................... None
See application file for complete search history.

(56) References Cited

U.S. PATENT DOCUMENTS

| | | | |
|---|---|---|---|
| 5,905,255 A | 5/1999 | Wakabayashi et al. | |
| 6,163,518 A | 12/2000 | Miyanabe et al. | |
| 6,172,950 B1 | 1/2001 | Tanaka | |
| 6,525,332 B1* | 2/2003 | Chang et al. ............. | 369/53.19 |
| 6,704,254 B1 | 3/2004 | Nishiwaki et al. | |
| 2002/0009032 A1 | 1/2002 | Tsukuda et al. | |
| 2002/0071364 A1* | 6/2002 | Yanagawa et al. ........ | 369/53.19 |
| 2004/0085869 A1 | 5/2004 | Takehara et al. | |

FOREIGN PATENT DOCUMENTS

| | | |
|---|---|---|
| WO | 9726651 | 7/1997 |
| WO | WO 03083850 A2 | 10/2003 |

* cited by examiner

*Primary Examiner*—Muhammad N. Edun (57) ABSTRACT

The invention relates to a tilt controller for controlling the tilt (radial and/or tangential) of an actuator relative to a recording surface of an optical storage medium, compensation for the radial to tilt crosstalk being effected by feeding a filtered version of the radial control signal (r) into the tilt branch, and/or compensation for the focus to tilt crosstalk being effected by feeding a filtered version of the focus control signal (f) into the tilt branch.

17 Claims, 8 Drawing Sheets

METHOD AND DEVICE FOR TILT COMPENSATION IN AN OPTICAL STORAGE SYSTEM

FIELD OF THE INVENTION

This invention relates generally to tilt compensation in an optical storage system. Examples of the storage media used in such an optical disc drive are, for instance, CD-ROM, CD-R, CD-RW, DVD, Blu-Ray Disc (BD), etc.

BACKGROUND OF THE INVENTION

As is commonly known, an optical storage disc comprises at least one track, either in the form of a continuous spiral or in the form of multiple concentric circles, of storage space where information may be stored. Optical discs may be of the read-only type, where information is recorded during manufacture, which data can only be read by a user. The optical storage disc may also be of the type that can be written to, where information may be stored by a user.

For writing information in the storage space of the optical storage disc, or for reading information from the disc, an optical disc drive comprises, on the one hand, rotating means for receiving and rotating an optical disc, and on the other hand optical means for scanning the storage track with an optical beam. Since the technology of optical discs in general, the way in which information can be stored in an optical disc, and the way in which optical data can be read from an optical disc, is commonly known, it is not necessary here to describe this technology in detail.

In all cases, however, to read out or record data, it is necessary to position an optical spot onto the disc track. The position of the readout spot is determined by the position of an objective lens provided for this purpose. Positioning of the readout spot and, therefore, the objective lens should be done in two directions: focus (from and towards the disc) and in a radial direction. This is achieved by moving the objective lens. Thus, the objective lens is mounted in an actuator, and control of the actuator is therefore used to perform focus and radial positioning of the optical spot. The focus position is kept in the plane of the information layer of an optical disc by means of a focus servo system that controls the axial position of the objective lens used for focusing the optical spot, and a radial servo system is provided to control the transverse position of the focus, in order to keep the optical spot focused on the track being scanned.

In principle, an optical disc should be kept in a flat disc shape when it is set in a disc motor, so that an optical pickup unit can keep its optical axis perpendicular to the recording surface of the disc during recording and reproducing operations. During scanning of the recording tracks, the optical pickup unit moves in a radial direction in alignment with the radius of the optical disc.

However, the optical disc set in the disc motor is not flat, mainly due to the manufacturing process. The optical disc curves in both the radial and circumferential directions. As a result, the optical axis of the optical pickup unit cannot be maintained precisely perpendicular to the recording surface of the disc without intervention. The angle formed between the optical axis and the recording surface in the radial direction is defined as the radial tilt angle.

The user data recorded on the optical disc is extracted from the High Frequency (HF) signal. Due to, for example, timing errors in the HF signal, a certain amount of jitter is always present when reading out an optical disc. Some contributors to such jitter are intersymbol interference, crosstalk between neighbouring tracks, disc manufacturing imperfections, together with ordinary noise which is present in all electrical circuits. The tilt angle between the disc and the objective lens results from two principal contributors, namely the disc (manufacturing tolerances and environmental changes) and the drive (objective lens actuator, turntable motor adjustment, axis adjustment, etc). The resulting angular deviations lead to comatic aberrations, i.e. a distortion of the optical readout spot on the disc. This distorted readout spot results directly in a distorted HF signal and, therefore, in timing errors, i.e. jitter. Generally, the jitter increases at a greater rate as the radial tilt becomes larger.

Tighter system tolerances in systems like DVD, DVD+RW and Blu-ray disc (BD) require decreased maximum allowed tilt errors. These maximum allowed tilt errors are specified in a so-called tilt window expressed in tilt window width. For CD, this window is typically +/−15 mrad, whereas for DVD+R/RW it is more typically +/−9 mrad. This tilt window is defined to achieve a jitter below a certain required level (typically 15%). If the total tilt in the readout system is larger than this window, the jitter will be too high and readout of user data is no longer possible.

Thus, as optical recording systems become more and more sensitive to tilt, i.e. angular deviations between the objective lens and the disc, systems (such as recordable DVD or BD) are equipped with means to actively compensate tilt.

There are many known ways of implementing active tilt compensation. Currently, the most common way is to add another degree of freedom to the well-known electro-magnetic two-dimensional (2D) actuator used in CD systems. As a result, a three-dimensional (3D) actuator capable of controlling three degrees of freedom is used. These degrees of freedom are z=focus (toward the disc), x=radial (from inner radius to outer radius) and β=tilt (rotation about the y axis), and this type of tilt compensation mechanism is employed in the arrangement described in International Patent Application No. WO 03/083850. This patent describes a method and device for performing tilt correction using a multi-dimensional actuator, in which a radial tilt value is determined based on a differentiation of focus control values obtained at different radii of the optical disc, and in which two split focus coils and a radial coil are employed, each of which generates a respective force Ff1, Ff2, and Fr depending on the current flowing in the coil windings, whereby an actuator tilt β is generated if Ff1=−Ff2 and a vertical (focus) movement is generated if Ff1=Ff2.

Figure 1A:
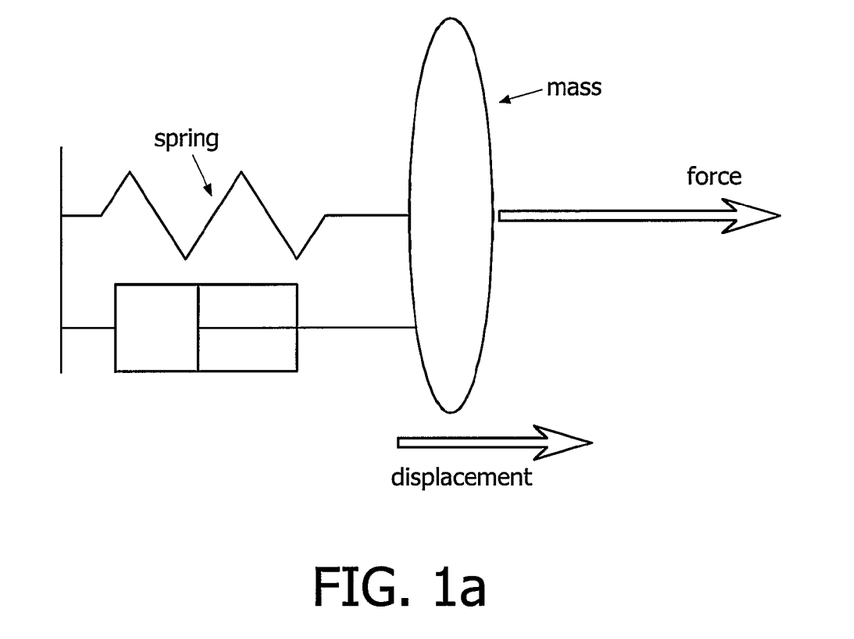
FIG. 1a is a schematic diagram illustrating a simple 1 degree of freedom (DOF) mass-spring-damper system.
Figure 1B:
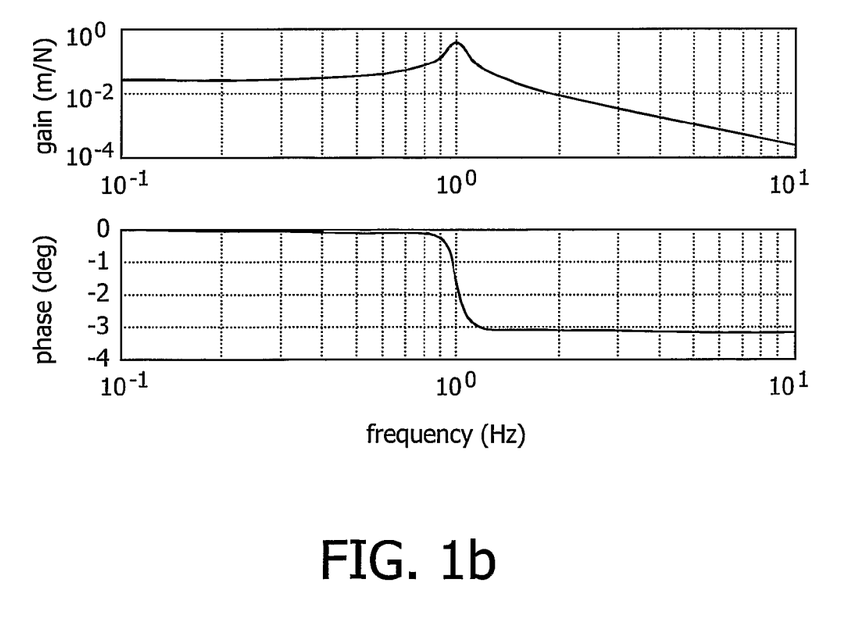

An ideal actuator is completely decoupled, i.e. if a focus control voltage is applied, motion should only occur in the focus direction. Since this type of actuator is built as a mass-spring system, some dynamic behaviour is present and, as a result, the frequency response function of an ideal actuator is equal to a simple 1 degree of freedom (DOF) mass-spring damper system, as illustrated schematically in FIGS. 1a and 1b. However, if the actuator is considered as a rigid body with 6 DOFs suspended in springs, there are 6 eigen-modes. In practice most of these modes show up in all transfer functions. In addition, crosstalk will be present to some extent.

Figure 2A:
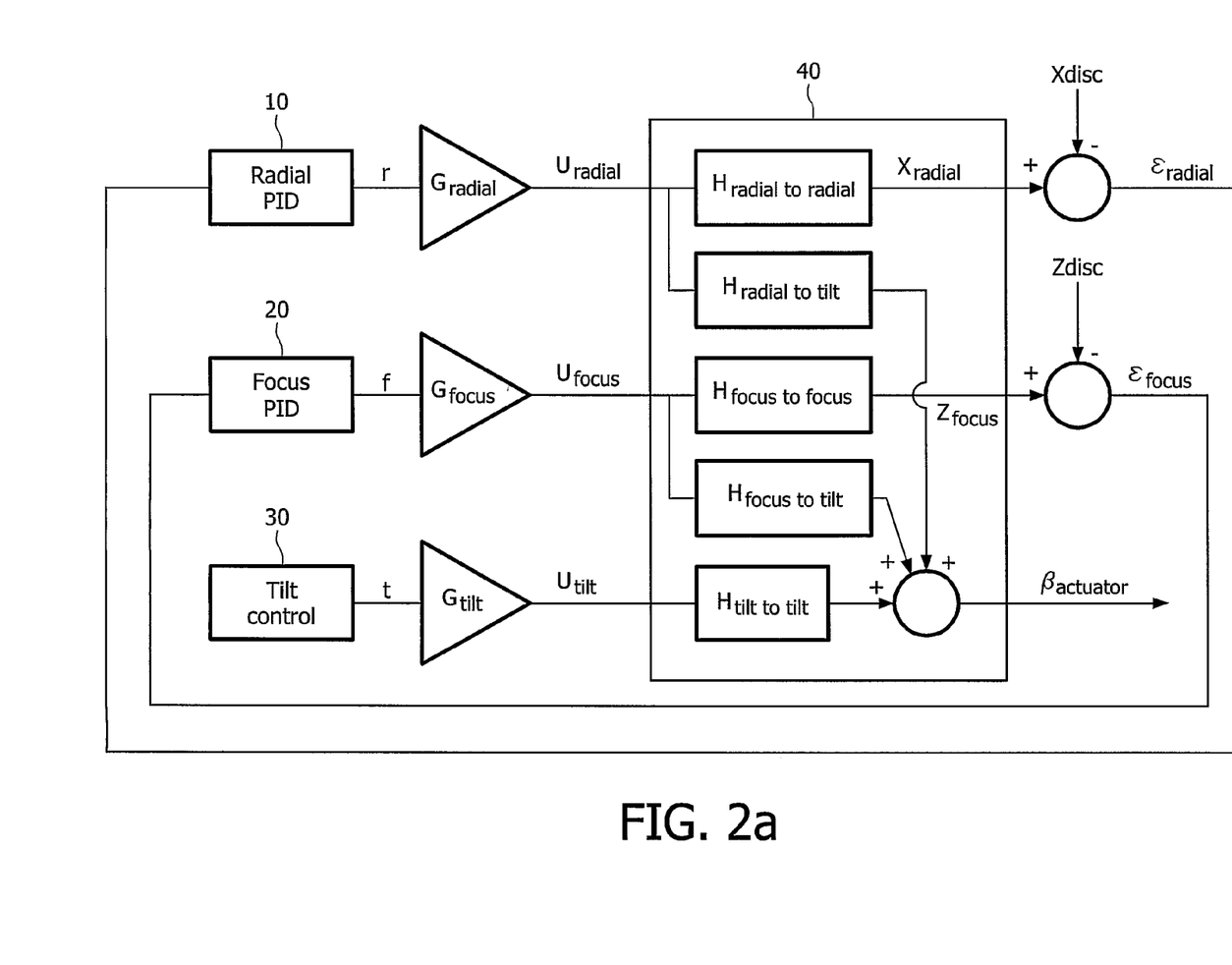
FIG. 2a is a schematic diagram illustrating the general structure of a conventional tilt controller.

Referring now to FIG. 2a, which is a schematic illustration of the general structure of a conventional tilt compensation mechanism for a 3D actuator, the concept of crosstalk from radial to tilt will now be described in more detail. It will be appreciated that the same principle holds for focus to tilt crosstalk.

A conventional tilt compensation mechanism comprises a radial Proportional Integral Derivative (PID) control unit 10 known as such by a skilled person, a focus PID control unit 20 known as such by a skilled person, and a tilt control unit 30 known as such by a skilled person.

The radial control unit 10 generates a radial control signal r which is amplified by the combined DAC/driver endstage gain $G_{radial}$ to a voltage $U_{radial}$. The radial control signal $U_{radial}$ is applied to the radial coil of a 3D actuator 40, and as a result, the actuator is caused to move in a radial direction, defined by the transfer function $H_{radial\_to\_radial}$. As explained above, the optical disc is not ideal (i.e. not perfect) and, therefore there will be some radial movement thereof relative to the actuator 40. The actuator 40 can be used to track this unknown disturbance $X_{disc}$. The position of the disc is not known in the drive, so an error signal $\epsilon_{radial}$ (corresponding to the difference between the radial position $X_{radial}$ of the disc and the actuator along the radial direction) is generated and fed back to the radial PID control unit 10 and controlled to zero, with the result that the disc can be tracked.

The focus control unit 20 generates a focus control signal f, which is amplified by the combined DAC/driver endstage gain $G_{focus}$ to a voltage $U_{focus}$. The focus control signal $U_{focus}$ is applied to the focus coil of a 3D actuator 40, and as a result, the actuator is caused to move in a focus direction, defined by the transfer function $H_{focus\_to\_focus}$. As explained above, the optical disc is not flat and, therefore there will be some vertical movement thereof relative to the actuator 40. The actuator 40 can be used to track this unknown disturbance $Z_{disc}$. The position of the disc is not known in the drive, so an error signal $\epsilon_{focus}$ (corresponding to the difference between the position $Z_{focus}$ of the disc and the actuator along the focus direction) is generated and fed back to the focus PID control unit 20 and controlled to zero, with the result that the disc can be tracked.

The tilt control unit 30 generates a tilt control signal t which is amplified by the combined DAC/driver endstage gain $G_{tilt}$ to a voltage $U_{tilt}$. The tilt control signal $U_{tilt}$ is applied to the tilt coils of the actuator 40, and as a result, the actuator is caused to move in tilt direction, defined by the frequency response function $H_{tilt\_to\_tilt}$. An example of such a transfer function is shown in FIG. 2*d*.

Crosstalk from radial to tilt is inevitably present to a certain extent, and occurs as a consequence of bad alignment or due to magnet inhomogenities. At low frequency, alignment with the 'centre of stiffness' is important, so the force has to act symmetrically in between the suspension springs of the actuator 40. At higher frequencies, the alignment with respect to the centre of gravity (COG) is important, and the force should act precisely through the COG. However, in a 3D actuator, the radial (and focus) force is never acting precisely in the COG and 'centre of stiffness', basically due to three main reasons:

manufacturing tolerances,
  design limitations,
  changing position of the force with respect to the moving part as the moving part has an offset in the focus or radial position. As a result, there is always crosstalk (represented by transfer function $H_{radial\_to\_tilt}$) to a certain extent.

Figure 2B:
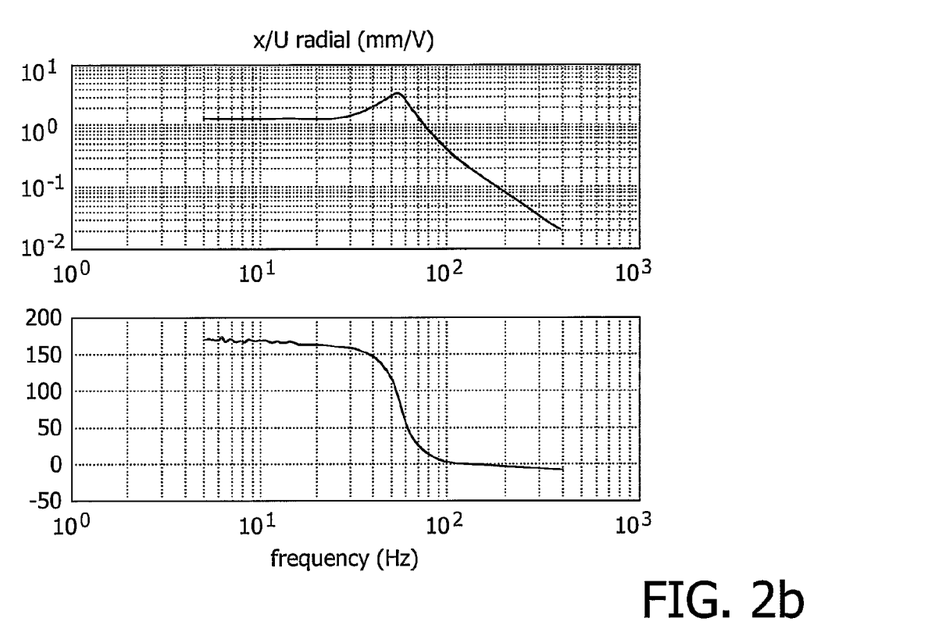

This concept is illustrated graphically in FIG. 2*b*, in which the frequency response function (FRF) $H_{radial\_to\_radial}$ of an actuator clearly demonstrating this problem is provided. The radial eigen-frequency is clearly visible at 55 Hz. Suppose the disc rotational speed is 100 Hz and the disc has an eccentricity of 0.1 mm. Because the sensitivity at 100 Hz is 0.4 mm/V, a harmonic voltage with amplitude of 0.25 V is needed. The radial control loop (a PID) will generate this control signal $U_{radial}$. It will be appreciated that higher harmonics are also generated at multiples of 100 Hz.

Figure 2C:
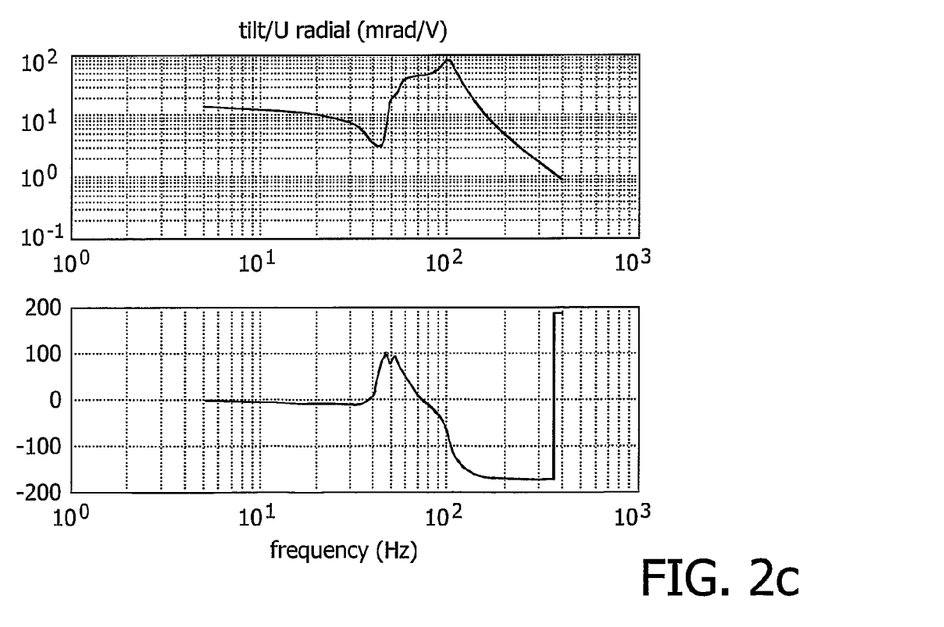
Figure 2D:
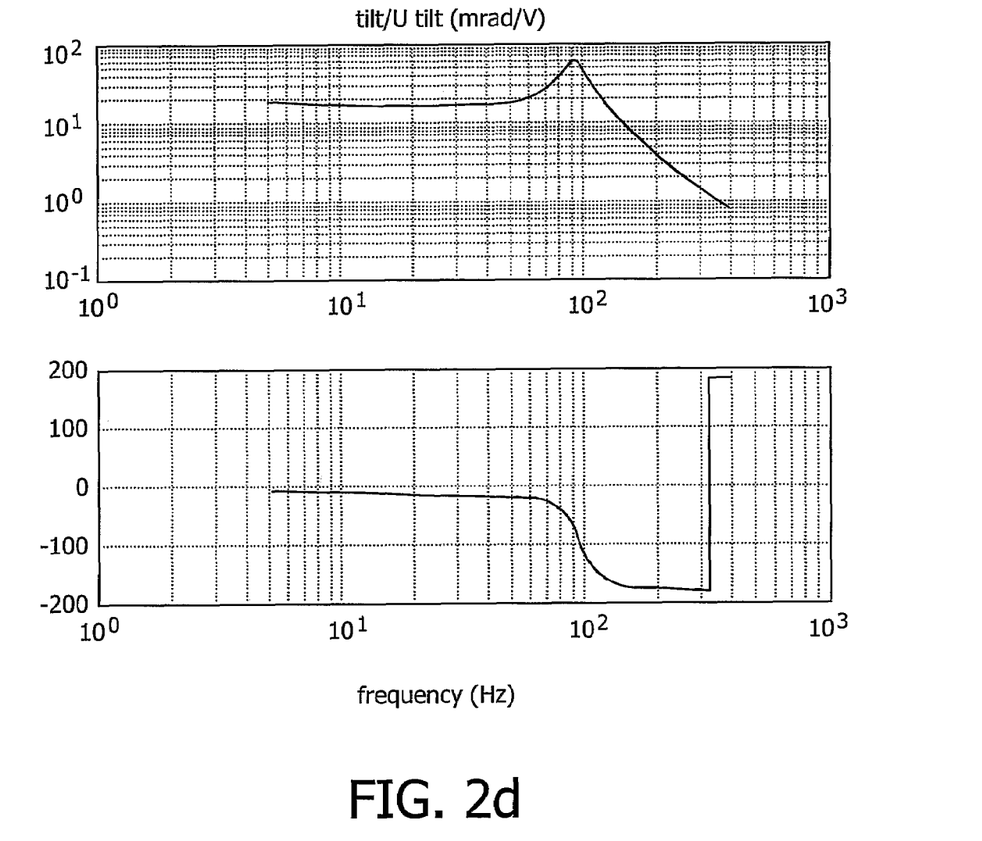

In FIG. 2*c*, a frequency response function $H_{radial\_to\_tilt}$ representative of crosstalk from $U_{radial\_to\_tilt}$ is illustrated. The gain at 100 Hz equals 65 mrad/V, so the radial voltage of 0.25 V will lead to a tilt amplitude of 0.25*65=16 mrad at a frequency of 100 Hz. Note that the peak at this frequency is due to the torsion eigen-frequency, which is 100 Hz for this actuator. Thus, at 100 Hz disc rotational speed, a harmonic tilt disturbance of 16 mrad is added. Because the bandwidth of current tilt compensation methods is very low (of the order of a few Hz), this tilt is not compensated at all, and the above-mentioned 16 mrad is much larger than the available tilt window. As a consequence, both read and write quality are unacceptably adversely affected.

Crosstalk from focus to tilt is equally inevitable, and the above-described principle applies.

Thus, radial to tilt crosstalk, represented by the frequency response function $H_{radial\_to\_tilt}$ in FIG. 2*a* has an effect on the movement $\beta_{actuator}$ of the actuator in the tilt direction. Similarly, focus to tilt crosstalk represented by the frequency response function $H_{focus\_to\_tilt}$ in FIG. 2*a* has an effect on $\beta_{actuator}$. These two contributions can be added up in the 'vector domain', as illustrated.

OBJECT AND SUMMARY OF THE INVENTION

Is an object of the present invention to provide a tilt compensating device for an actuator of an optical scanning head in an optical storage system, which minimises the radial to tilt crosstalk and/or the focus to tilt crosstalk.

In the following, "ctr" stands for CrossTalk Radial, and "ctf" stands for CrossTalk Focus.

In accordance with the present invention, there is provided a tilt controller for controlling the tilt of an actuator relative to a recording surface of an optical storage medium, said tilt controller comprising:

a) control means for generating a radial control signal for controlling movement of said actuator in a radial direction,
  b) a tilt branch for generating a tilt control signal for controlling tilt of said actuator,
  c) a first filter intended to be applied to said radial control signal for generating a filtered radial control signal,
  d) means for adding said filtered radial control signal to said tilt control signal.

This tilt controller allows to minimise the radial to tilt crosstalk.

Also in accordance with the present invention, there is provided a tilt controller for controlling the tilt of an actuator relative to a recording surface of an optical storage medium, said tilt controller comprising:

a) control means for generating a focus control signal for controlling movement of said actuator in a focus direction,
  b) a tilt branch for generating a tilt control signal for controlling tilt of said actuator,
  c) a second filter intended to be applied to said focus control signal for generating a filtered focus control signal,
  d) means for adding said filtered focus control signal to said tilt control signal.

This tilt controller allows to minimise the focus to tilt crosstalk.

Also in accordance with the present invention, there is provided a tilt controller for controlling the tilt of an actuator relative to a recording surface of an optical storage medium, said tilt controller comprising:

a) control means for generating a radial control signal for controlling movement of said actuator in a radial direction,
b) control means for generating a focus control signal for controlling movement of said actuator in a focus direction,
c) a tilt branch for generating a tilt control signal for controlling tilt of said actuator,
d) a first filter intended to be applied to said radial control signal for generating a filtered radial control signal,
e) a second filter intended to be applied to said focus control signal for generating a filtered focus control signal,
f) means for adding said filtered radial control signal and said filtered focus control signal to said tilt control signal.

This tilt controller allows to minimise the radial to tilt crosstalk, and the focus to tilt crosstalk.

The present invention extends to a method of controlling the tilt (either radial and/or tangential) of an actuator relative to a recording surface of an optical storage medium, said method carrying out the various steps of the functions performed by said tilt controller according to the invention.

The invention allows to compensate for the coupling of movements along different directions (radial, tangential, focus, tilt), said coupling being caused by radial to tilt crosstalk and or focus to tilt crosstalk.

By feeding forward the radial control signal and/or the focus control signal to the tilt branch for use in generating the tilt control signal, radial to tilt crosstalk and/or focus to tilt crosstalk which occurs within the actuator can be compensated for. As a consequence, the actuator has nearly ideal characteristics.

Advantageously, the transfer function of the first and/or second filters may simply be a non-zero gain, resulting in a cost-effective solution from a processing means point of view.

Advantageously, the transfer function of the first and/or second filters may corresponds to band-pass filters, so as to filter higher harmonics and DC radial and/or focus components, and to minimise power dissipation.

Advantageously, the transfer function of the first filter may be defined as a ratio of a radial to tilt frequency response and a tilt to tilt frequency response characterizing said actuator, and/or the second filter may be defined as a ratio of a focus to tilt frequency response and a tilt to tilt frequency response characterizing said actuator.

The present invention extends still further to an optical storage system comprising an actuator and a tilt controller according to the invention, for controlling tilt of said actuator relative to a recording surface of an optical storage medium.

Beneficially, the actuator is mounted relative to said optical storage medium by means of a plurality of springs, wherein at least three coils are provided for effecting movement of said actuator in respective radial, focus and tilt directions by application of a current or voltage thereto based on said radial, focus and tilt control signals respectively. Thus, at least one coil is provided in respect of each movement direction.

These and other aspects of the present invention will be apparent from, and elucidated with reference to the embodiment described herein.

BRIEF DESCRIPTION OF THE DRAWINGS

An embodiment of the present invention will now be described by way of example only and with reference to the accompanying drawings, in which:

FIG. 1b illustrates graphically the frequency response function of the mass-spring-damper system of FIG. 1a;

FIG. 2b illustrates graphically the radial to radial frequency response function of the control device of FIG. 2a;

FIG. 2c illustrates graphically a radial to tilt frequency response function, representative of radial to tilt crosstalk, in respect of the control device of FIG. 2a;

FIG. 2d illustrates graphically a tilt to tilt frequency response function in respect of the control device of FIG. 2a;

DETAILED DESCRIPTION OF THE INVENTION

Figure 3:
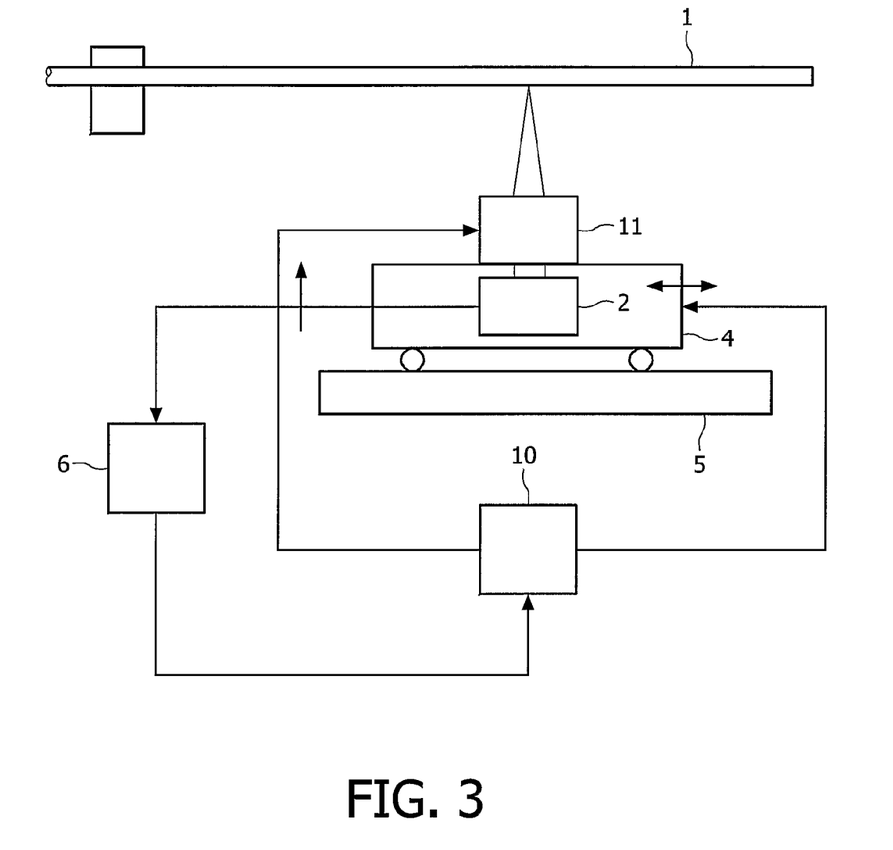
FIG. 3 is a basic block diagram of a tilt controller according to an exemplary embodiment of the present invention.

In FIG. 3, a tilt control arrangement or device is shown for correcting tilt with respect to an optical disc 1. The tilt controller comprises an optical pickup unit comprising a movable carriage or sledge 4 for moving the optical pickup unit in a radial direction on a platform 5. The optical pickup unit comprises an optical head 2 which directs and receives a radiation beam to/from the optical disc 1 through a 3D actuator 11 arranged to control focus, tilt and radial position of the 3D actuator by a three-dimensional actuating function based on focus coils. Each of the focus coils of the actuator 11 is driven based on a respective control signal received from a processor 10.

Furthermore, a focus evaluator 6 is provided which produces a focusing error signal based on a beam reflection signal obtained in respect of the optical head 2. Tilt may be measured using a separate tilt sensor comprising a light emitting device, a lens and a detector. The light reflected from the optical disc is captured on the detector and the sensor is arranged to measure tilt between the disc and the optical pickup unit. However, in a preferred embodiment, it is preferred not to employ a separate tilt sensor (because this increases the overall cost of the device unnecessarily. Instead, the tilt position of the actuator 11 is preferably calibrated by measuring the tilt 'bathtub', whereby minimum jitter is identified by means of a known search procedure. In any event, a tilt value, however obtained, is used in the calculation or generation of a tilt control output signal $U_{tilt}$ used for controlling the 3D actuator during a disc tracking operation.

Figure 4:
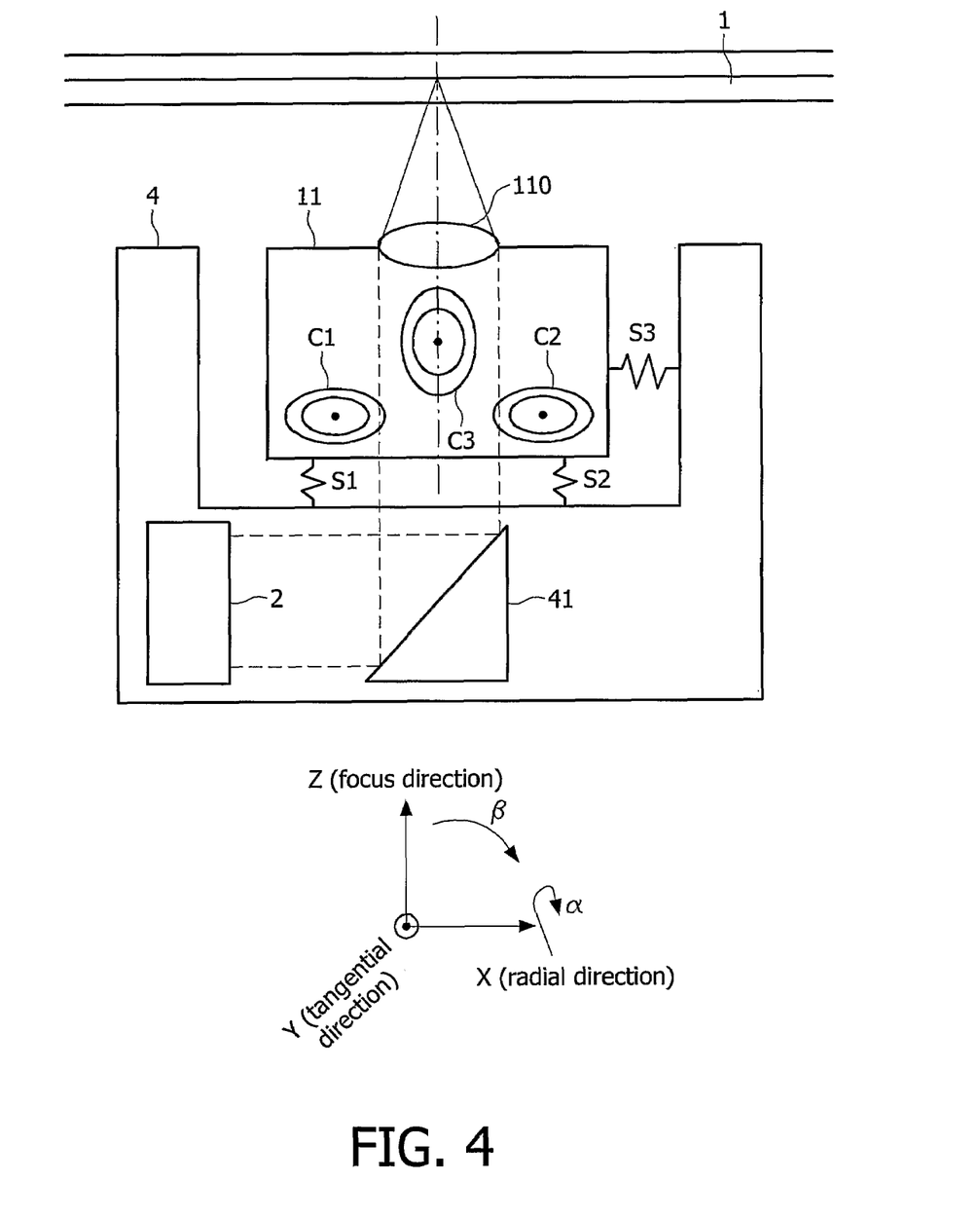
FIG. 4 is a schematic arrangement of a 3D actuator that can be used in respect of a control device according to an exemplary embodiment of the present invention.

FIG. 4 shows a more detailed schematic diagram of the arrangement of the 3D actuator 11. The 3D actuator is fixed at the sledge 4 by spring arrangements S1 to S3 so as to allow three-dimensional movement of the 3D actuator 11 with respect to the sledge 4 and the recording surface of the optical disc 1. Thereby, the point at which the radiation beam impinges on the recording surface of the optical disc 1 and the impinging angle of the radiation beam with respect to the recording surface can be controlled. The radiation beam is directed between the optical head 2 and the optical disc 1 via a mirror 41 and an objective lens 110. The optical head 2 comprises a radiation source (not shown), e.g. a laser, for generating the radiation beam, e.g. a laser beam, and a detector (not shown) for receiving light reflected at the recording surface of the optical disc 1 and guided back to the optical head 2 via the objective lens 110 and the mirror 41. Based on the reflected light signals detected at the optical head 2, radial tracking error signal $\epsilon_{radial}$ (corresponding to the difference between the radial position $X_{radial}$ of the disc and the actuator along the radial direction) and focus tracking error signal $\epsilon_{focus}$ (corresponding to the difference between the position $Z_{focus}$ of the disc and the actuator along the focus direction) can be generated and fed back in the radial PID 10 and focus PID 20, respectively.

Furthermore, the 3D actuator 11 comprises coils C1, C2 and C3 for controlling radial, focus and tilt positions (either radial and/or tangential) of the 3D actuator 11. The coil C3 is intended to receive signals $\beta_{actuator}$ and/or $\alpha_{actuator}$. When a voltage is applied to the coils and the coils are arranged in a magnetic field, each of the coils generates a respective force, depending upon the current I flowing through the coil windings. The force generated by each of the coils can be calculated based on the known Lorentz equation:

$$F = k \cdot I \cdot [N/A]$$

Thus, the factor k indicates the amount of force generated due to current I.

Figure 5:
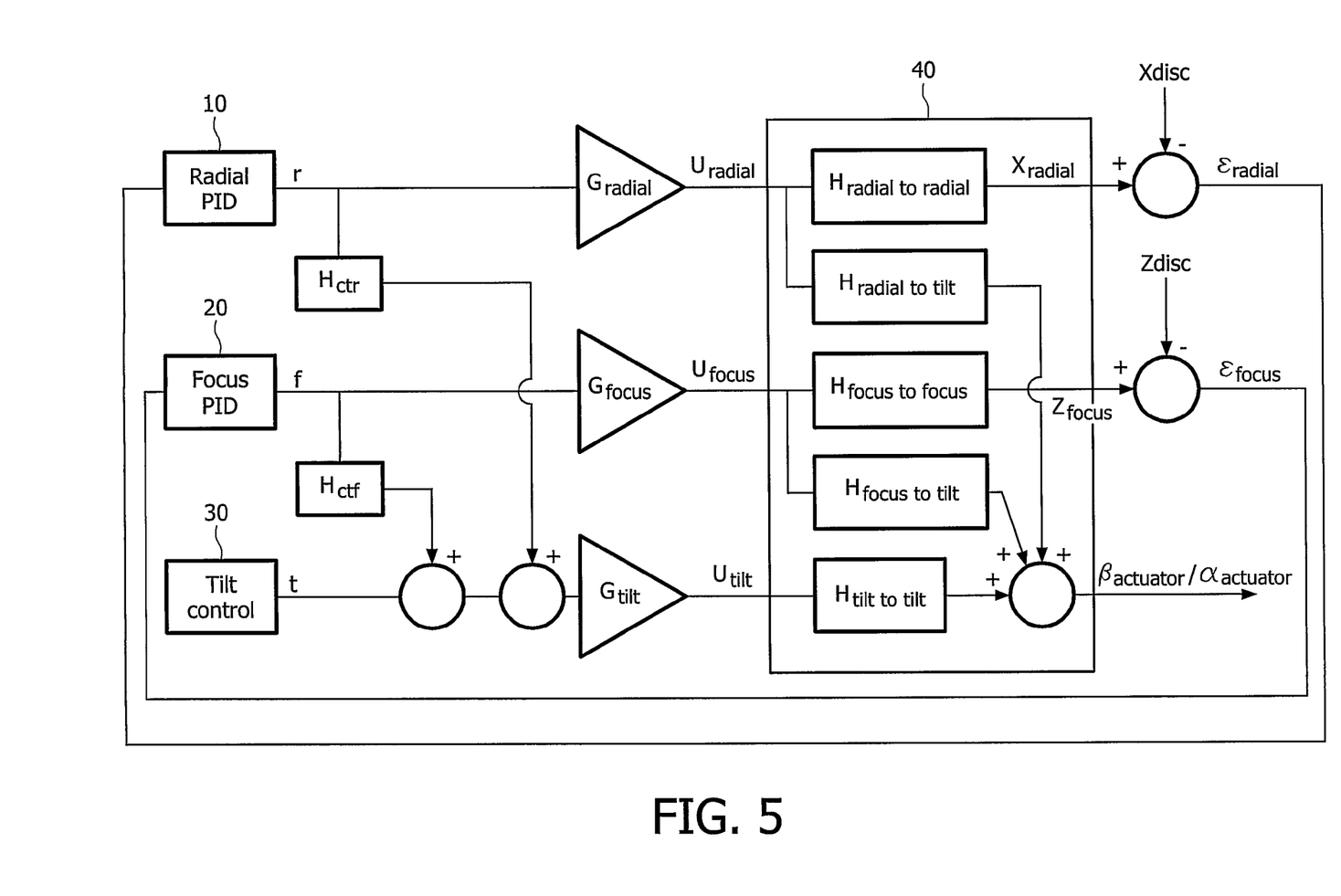
FIG. 5 is a schematic diagram illustrating the general structure of a control device according to an exemplary embodiment of the present invention.

Referring to FIG. 5 of the drawings, the general structure of a tilt controller according to an exemplary embodiment of the present invention is illustrated schematically.

In this case, many of the illustrated elements of the structure are the same as those of the control device illustrated schematically in FIG. 2a of the drawings, and like elements thereof are denoted by like reference numerals in the arrangement of FIG. 5. Thus, once again, radial, focus and tilt control units 10, 20, 30 are provided to generate respective radial focus and tilt control signals $U_{radial}$, $U_{focus}$ and $U_{tilt}$, which are again dependent on the respective ADC/endstage gains $G_{radial}$, $G_{focus}$ and $G_{tilt}$. The voltages are applied to the respective coils of the 3D actuator to effect movement thereof in the desired direction. This movement in the radial and focus directions is again defined and represented by the respective frequency response function $H_{radial\_to\_radial}$, $H_{focus\_to\_focus}$, and the frequency response function $H_{tilt\_to\_tilt}$ is illustrated graphically in FIG. 2d of the drawings.

Compensation for the radial to tilt crosstalk is effected in accordance with the invention by feeding a filtered version of the radial control signal r into the tilt branch. This is achieved in accordance with this exemplary embodiment of the present invention by using in the control loop a digital filter having a frequency response function $H_{ctr}$ intended to receive the radial control signal r, and whose output signal is added to the tilt control signal t. This leads to highly reduce the negative effects originating from the tilt crosstalk within the actuator.

Compensation for the focus to tilt crosstalk is effected in accordance with the invention by feeding a filtered version of the focus control signal f into the tilt branch. This is achieved in accordance with this exemplary embodiment of the present invention by using in the control loop a digital filter having a frequency response function $H_{ctf}$ intended to receive the focus control signal f, and whose output signal is added to the tilt control signal t. This also leads to highly reduce the negative effects originating from the tilt crosstalk within the actuator.

The tilt control signal $U_{tilt}$ is thus defined by the following relation:

$$U_{tilt}(j\omega) = G_{tilt}(j\omega) * [H_{ctr}(j\omega)*r + H_{ctf}(j\omega)*f + t]$$

Figure 6:
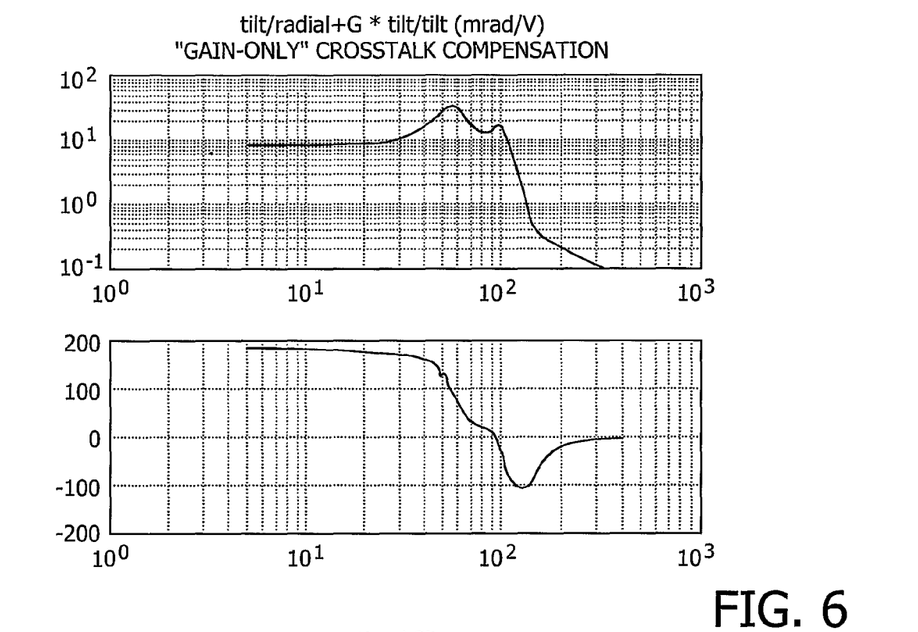
FIG. 6 illustrates graphically the radial to tilt frequency response function for a control device according to an exemplary embodiment of the present invention.

According to a first embodiment, the device of the invention may be arranged to provide 'gain-only' radial to tilt crosstalk compensation, and focus to tilt crosstalk compensation. The resulting effective radial to tilt frequency response function (FRF) is illustrated graphically in FIG. 6 of the drawings for $H_{ctr}(j\omega) = G_{opt} \sim -1.2$ (calculated from the actuator transfer functions). It can be seen that, at 100 Hz, the gain is 16 mrad/V, so a required radial voltage of 0.25 V will lead to a tilt of 4 mrad, as opposed to the 16 mrad tilt provided by the prior art arrangement and described with reference to FIG. 2c.

If a constant (non-zero) gain is used, the value thereof may be determined either from a search procedure using a known calibration/optimization algorithm, or it may be calculated from the actuator transfer functions at a critical frequency (e.g. 100 Hz) based on a sensitivity of the control device.

However, minimising tilt is not the only important factor when determining $H_{ctr}$ since power dissipation must also be considered. Power dissipation may be unnecessarily high in the case where only a simple gain is used. Therefore, $H_{ctr}$ and/or $H_{ctf}$ preferably correspond to bandpass filters in order to filter higher harmonics and DC radial and focus components.

Advantageously, an optimized filter $H_{ctr\_opt}$ of the filter $H_{ctr}$ may be defined for reducing radial to tilt crosstalk to an arbitrary low level. The optimized filter $H_{ctr\_opt}$ is the filter $H_{ctr}$ which minimizes the total contribution of the tilt referred to as $tilt_{total}$ and defined by the following relation:

$$tilt_{total} = H_{radial\_to\_tilt}(j\omega)*G_{radial}*r + H_{tilt\_to\_tilt}(j\omega)*H_{ctr}(j\omega)*G_{tilt}*r$$

If $tilt_{total}$ is close to 0, the optimized filter $H_{ctr\_opt}$ is approximated by the following relation:

$$H_{ctr\_opt}(j\omega) = -G_{radial}*H_{radial\_to\_tilt}(j\omega)/(H_{tilt\_to\_tilt}(j\omega)*G_{tilt})$$

If $G_{radial} = G_{focus} = G_{tilt} = G_0$, then the optimized filter $H_{ctr\_opt}$ is defined as a ratio of minus $H_{radial\_to\_tilt}(j\omega)$ and $H_{tilt\_to\_tilt}(j\omega)$.

Figure 7:
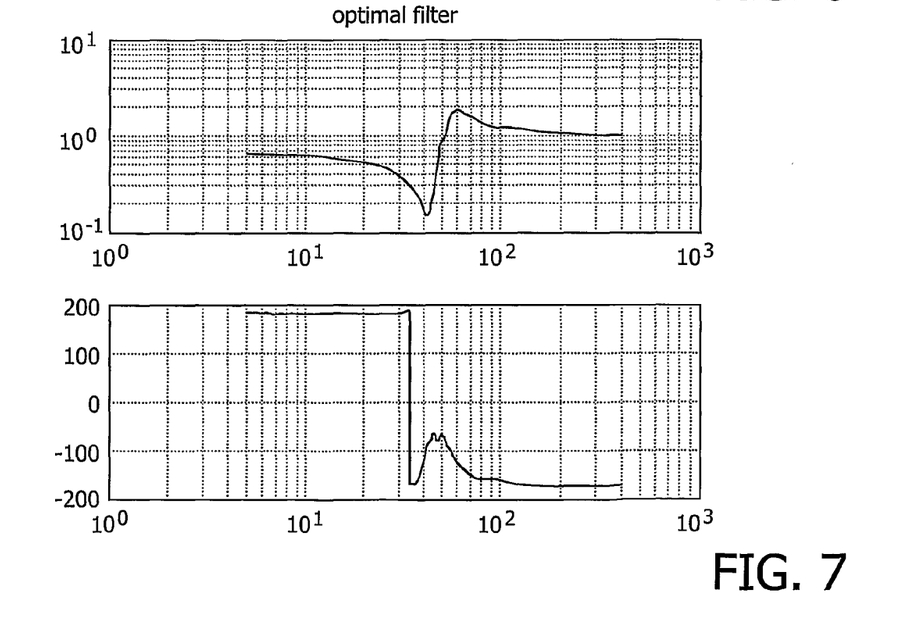
FIG. 7 illustrates graphically the transfer function of an optimal filter for use in a control device according to an exemplary embodiment of the present invention.

Such a frequency response function for the optimal filter $H_{ctr\_opt}$ in respect of this actuator is illustrated graphically in FIG. 7 of the drawings.

The optimized filter $H_{ctr\_opt}$ is dependent on the nominal position of the actuator in the z (focus) direction. If there is an offset between the turntable and the motor and/or the disc is umbrella-shaped, then the position of the radial force will move with respect to the moving part of the actuator, thereby changing the crosstalk, such that another optimized filter $H_{ctr\_opt}$ may be required.

Advantageously, an optimized filter $H_{ctf\_opt}$ of the filter $H_{ctf}$ may be defined for reducing focus to tilt crosstalk to an arbitrary low level. The optimized filter $H_{ctf\_opt}$ is the filter $H_{ctf}$ which minimizes the total contribution of the tilt referred to as $tilt_{total}$ and defined by the following relation:

$$tilt_{total} = H_{focus\_to\_tilt}(j\omega)*G_{focus}*f + H_{tilt\_to\_tilt}(j\omega)*H_{ctf}(j\omega)*G_{tilt}*f$$

If $tilt_{total}$ is close to 0, the optimized filter $H_{ctf\_opt}$ is approximated by the following relation:

$$H_{ctf\_opt}(j\omega) = -G_{focus}*H_{focus\_to\_tilt}(j\omega)/(H_{tilt\_to\_tilt}(j\omega)*G_{tilt})$$

If $G_{radial} = G_{focus} = G_{tilt} = G_0$, then the optimized filter $H_{ctf\_opt}$ is defined as a ratio of minus $H_{focus\_to\_tilt}(j\omega)$ and $H_{tilt\_to\_tilt}(j\omega)$.

According to FIG. 5, the tilt branch has been described for the case of radial tilt. However, it is apparent to a skilled person that the tilt branch also applies for the case of tangential tilt, i.e. a rotation around axis x. A signal $\alpha_{actuator}$ would thus be generated and applied to a coil (not shown) of the actuator for correcting the tangential tilt, similarly as with signal $\beta_{actuator}$.

The above-described method can be applied in respect of all optical recording devices using an actuator with high crosstalk from radial (and/or focus) to tilt. Generally, such an actuator has the largest crosstalk in the tilt eigen-frequency, so the present invention is particularly applicable in drives with a tilt eigen-frequency close to the disc rotational speed. Thus, the method can be used to lower the tilt eigen-frequency (for improving tilt efficiency) and maintain low effective crosstalk.

It will be appreciated that the (parameterised) optimal filter $H_{opt}$ (standing for $H_{ctf\_opt}/H_{ctr\_opt}$, or alternatively for $G_0$) can be relatively easily calibrated, and an example of a suitable calibration algorithm for 'gain-only' feedback is:

for i=−5 to 5
        $G_i$=(1+i/20)$G_{nom}$ ($G_{nom}$ is a nominal starting value determined off-line)
        Adjust Gain $G_i$ ($G_i$ is adjusted by replacing the crosstalk filter (in the case the crosstalk filter is a gain)
        Measure and average jitter over one revolution→$jitter_i$ (this correspond to a quality measurement of the jitter, e.g. the lower the jitter the better, and averaging samples over one revolution of the disc or alternatively using a low-pass filter)
    end
        find $G_i$=$G_{opt}$ having minimum jitter from the set of plotted samples ($G_i$, $jitter_i$)
    adjust gain $G_{opt}$ It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A tilt controller for controlling the tilt of an actuator relative to a recording surface of an optical storage medium, said tilt controller comprising:
   a) control means for generating a radial control signal (r) for controlling movement of said actuator in a radial direction,
   b) a tilt branch for generating a tilt control signal (t) for controlling tilt of said actuator,
   c) a first filter ($H_{ctr}$) intended to be applied to said radial control signal (r) for generating a filtered radial control signal,
   d) means for adding said filtered radial control signal to said tilt control signal (t).

2. A tilt controller according to claim 1, wherein said first filter ($H_{ctr}$) is a constant non-zero gain.

3. A tilt controller according to claim 1, wherein said first filter ($H_{ctr}$) is a bandpass filter.

4. A tilt controller according to claim 1, wherein said first filter ($H_{ctr}$) is defined as the minus of a ratio of a radial to tilt frequency response ($H_{radial\_to\_tilt}$) and a tilt to tilt frequency response ($H_{tilt\_to\_tilt}$) characterizing said actuator.

5. An optical storage system comprising an actuator and a tilt controller according to claim 1, for controlling tilt of said actuator relative to a recording surface of an optical storage medium.

6. An optical storage system according to claim 5, wherein the actuator is mounted relative to said optical storage medium by means of a plurality of springs, and wherein at least three coils are provided for effecting movement of said actuator in respective radial, focus and tilt directions by application of a current or voltage thereto based radial, focus and tilt control signals respectively.

7. A tilt controller for controlling the tilt of an actuator relative to a recording surface of an optical storage medium, said tilt controller comprising:
   a) control means for generating a focus control signal (f) for controlling movement of said actuator in a focus direction,
   b) a tilt branch for generating a tilt control signal (t) for controlling tilt of said actuator,
   c) a second filter ($H_{ctf}$) intended to be applied to said focus control signal (f) for generating a filtered focus control signal,
   d) means for adding said filtered focus control signal to said tilt control signal (t).

8. A tilt controller according to claim 7, wherein said second filter ($H_{ctf}$) is a constant non-zero gain.

9. A tilt controller according to claim 7, wherein said second filter ($H_{ctf}$) is a bandpass filter.

10. A tilt controller according to claim 7, wherein said second filter ($H_{ctf}$) is defined as the minus of a ratio of a focus to tilt frequency response ($H_{focus\_to\_tilt}$) and a tilt to tilt frequency response ($H_{tilt\_to\_tilt}$) characterizing said actuator.

11. A tilt controller for controlling the tilt of an actuator relative to a recording surface of an optical storage medium, said tilt controller comprising:
   a) control means for generating a radial control signal (r) for controlling movement of said actuator in a radial direction,
   b) control means for generating a focus control signal (f) for controlling movement of said actuator in a focus direction,
   c) a tilt branch for generating a tilt control signal (t) for controlling tilt of said actuator,
   d) a first filter ($H_{ctr}$) intended to be applied to said radial control signal (r) for generating a filtered radial control signal,
   e) a second filter ($H_{ctr}$) intended to be applied to said focus control signal (f) for generating a filtered focus control signal,
   f) means for adding said filtered radial control signal and said filtered focus control signal to said tilt control signal (t).

12. A tilt controller according to claim 11, wherein said first and second filters ($H_{ctr}$, $H_{ctf}$) are constant non-zero gains.

13. A tilt controller according to claim 11, wherein said first and second filters ($H_{ctr}$, $H_{ctf}$) are bandpass filters.

14. A tilt controller according to claim 11, wherein said first filter ($H_{ctr}$) is defined as a ratio of a radial to tilt frequency response ($H_{radial\_to\_tilt}$) and a tilt to tilt frequency response ($H_{tilt\_to\_tilt}$) characterizing said actuator, and wherein said second filter ($H_{ctf}$) is defined as a ratio of a focus to tilt frequency response ($H_{focus\_to\_tilt}$) and a tilt to tilt frequency response ($H_{tilt\_to\_tilt}$) characterizing said actuator.

15. A method of controlling the tilt of an actuator relative to a recording surface of an optical storage medium, said method comprising the steps of
 a) generating a radial control signal (r) for controlling movement of said actuator in a radial direction,
 b) generating a tilt control signal (t) for controlling tilt of said actuator,
 c) filtering said radial control signal (r) for generating a filtered radial control signal,
 d) adding said filtered radial control signal to said tilt control signal (t).

16. A method of controlling the tilt of an actuator relative to a recording surface of an optical storage medium, said method comprising the steps of:
 a) generating a focus control signal (f) for controlling movement of said actuator in a focus direction,
 b) generating a tilt control signal (t) for controlling tilt of said actuator,
 c) filtering said focus control signal (f) for generating a filtered focus control signal,
 d) adding said filtered focus control signal to said tilt control signal (t).

17. A method of controlling the tilt of an actuator relative to a recording surface of an optical storage medium, said method comprising the steps of
 a) generating a radial control signal (r) for controlling movement of said actuator in a radial direction,
 b) generating a focus control signal (f) for controlling movement of said actuator in a focus direction,
 c) generating a tilt control signal (t) for controlling tilt of said actuator,
 d) filtering said radial control signal (r) for generating a filtered radial control signal,
 e) filtering said focus control signal (f) for generating a filtered focus control signal,
 f) adding said filtered radial control signal and said filtered focus control signal to said tilt control signal (t).

* * * * *